United States Patent [19]
Carruet et al.

[11] 3,964,055
[45] June 15, 1976

[54] DATA PROCESSING SYSTEM EMPLOYING ONE OF A PLURALITY OF IDENTICAL PROCESSORS AS A CONTROLLER

[75] Inventors: Valére Jean Marie Carruet, Mechelen; Freddy Josse Melanie Verspecht, Vlezenbeek, both of Belgium

[73] Assignee: International Standard Electric Corporation, New York, N.Y.

[22] Filed: Oct. 9, 1973

[21] Appl. No.: 404,741

[30] Foreign Application Priority Data
Oct. 9, 1972 Belgium .............................. 789828

[52] U.S. Cl. ............................................ 340/172.5
[51] Int. Cl.² ........................................ G06F 11/00
[58] Field of Search ................................ 340/172.5; 235/153 AE

[56] References Cited
UNITED STATES PATENTS

| | | | |
|---|---|---|---|
| 3,252,149 | 5/1966 | Weida et al. | 340/172.5 |
| 3,303,474 | 2/1967 | Moore et al. | 340/172.5 |
| 3,312,947 | 4/1967 | Raspanti | 340/172.5 |
| 3,409,877 | 11/1968 | Alterman et al. | 340/172.5 |
| 3,503,048 | 3/1970 | Avsan et al. | 340/172.5 |
| 3,562,716 | 2/1971 | Fontaine et al. | 340/172.5 |
| 3,566,358 | 2/1971 | Hasbrouck | 340/172.5 |
| 3,623,014 | 11/1971 | Doelz et al. | 340/172.5 |
| 3,634,830 | 1/1972 | Baskin | 340/172.5 |
| 3,654,603 | 4/1972 | Gunning et al. | 340/172.5 X |
| 3,665,421 | 5/1972 | Rehhausser et al. | 340/172.5 |
| 3,665,487 | 5/1972 | Campbell et al. | 340/172.5 |
| 3,753,234 | 8/1973 | Gilbert et al. | 340/172.5 |
| 3,768,074 | 10/1973 | Sharp et al. | 340/172.5 |
| R27,703 | 7/1973 | Stafford et al. | 340/172.5 |

OTHER PUBLICATIONS

Chao, S. K. "The System Organization of MOBIDIC B" in 1959 proceedings of the Eastern Joint Computer Conference, pp. 101-107.

*Primary Examiner*—Raulfe B. Zache
*Attorney, Agent, or Firm*—J. B. Raden; D. P. Warner

[57] ABSTRACT

The system employs a plurality of identical processors and a plurality of memory units to which the processors have access. A single chosen processor is allotted to perform specific functions, this processor being selected in advance. At least one other processor is coupled to the system to enable it to provide the same specific functions so that it can be substituted in case the chosen processor becomes disabled. In this way, failure of the chosen processor is prevented from disabling the system.

11 Claims, 6 Drawing Figures

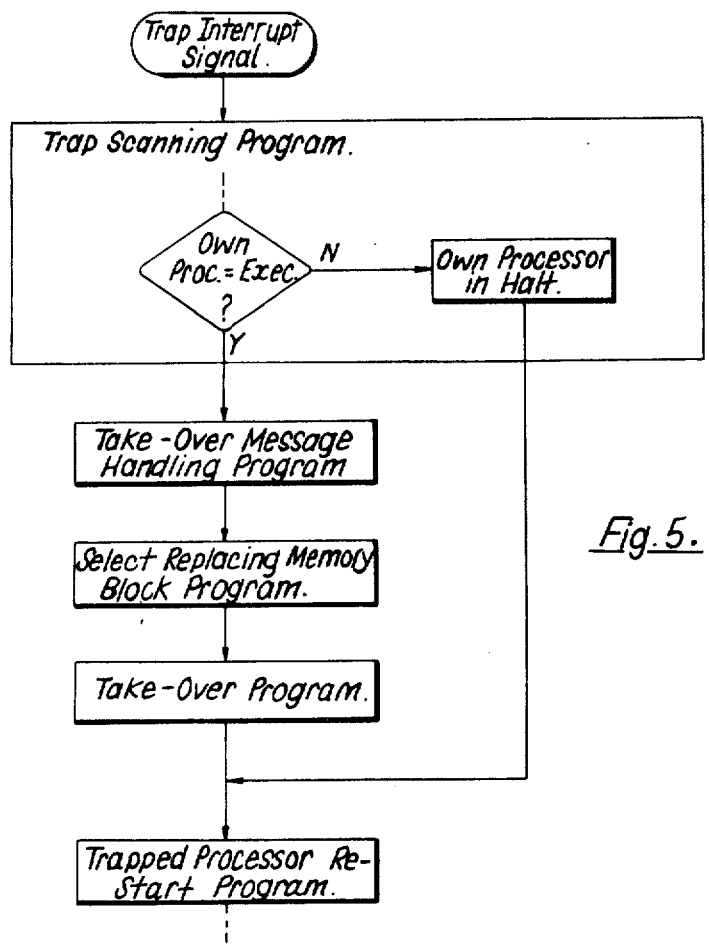
_Fig. 5._
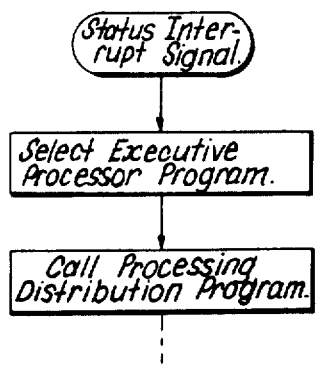
_Fig. 6._

DATA PROCESSING SYSTEM EMPLOYING ONE OF A PLURALITY OF IDENTICAL PROCESSORS AS A CONTROLLER

BACKGROUND OF THE INVENTION

1. Field of the Invention

The present invention relates to a data processing control system including a plurality of identical processors and a plurality of memory units to which the processors have access. Only a single one of the processors is allowed to execute predetermined programs at a given time. At least one other of the identical processors may be used to execute programs in event of failure of the first one.

2. Description of the Prior Art

Data processing control systems are already known wherein one processor, or a master processor, is a predetermined invariable one. The drawback of such known systems is that a failure in the master processor disables the entire system. Another drawback is that the master processor is generally a specialized one which is different from the other processors.

BRIEF SUMMARY OF THE INVENTION

An object of the present invention is therefore to provide a data processing control system of the above type which does not present these drawbacks.

According to the present invention this is achieved due to the fact that among the processors which are all alike, said one processor, or controlling processor, is any of at least two of said processors and is selected in advance as the most suitable one to execute said predetermined programs, i.e. prior to the occurrence of the necessity to execute said predetermined programs.

Hence, an advantage of the present system is that it includes a floating master processor which is like to all other processors in the system, making possible a substitution of at least one other processor for a controlling processor in case of failure of the controlling processor.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIGS. 5 and 6 are flow charts of programs able to be executed by the data processing control system of FIG. 1.

DESCRIPTION OF A PREFERRED EMBODIMENT

Figure 1:
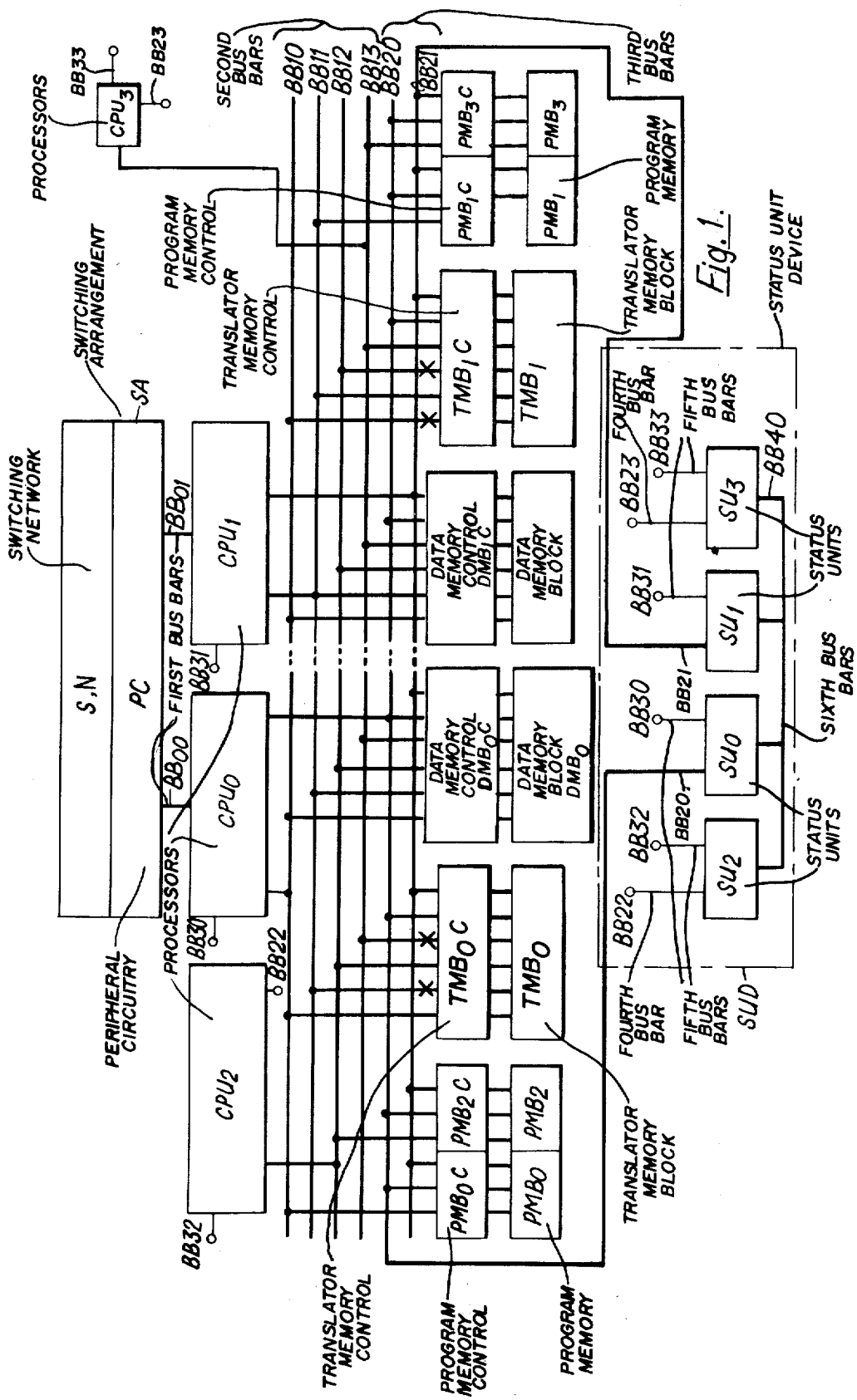
FIG. 1 is a block diagram of the data processing control system according to the present invention.

Principally referring to FIG. 1 the data control processing system shown therein includes a switching arrangement SA, a plurality of like processors CPU0, CPU1, CPU2 and CPU3 of a classical type which are therefore not described in detail, a memory including a plurality of memory blocks PMB0 PMB1, PMB2, PMB3, TMB0, TMB1, DMB0 and DMB1 with their associated memory controllers $PMB_0C$, PMB1C, PMB2C, PMB3C, TMB0C, TMB1C, DMB0C and DMB1C respectively, a status unit device SUD and a plurality of busbars:

the first busbars BB00 and BB01;
the second busbars BB10, BB11, BB12 and BB13;
the third busbars BB20 and BB21;
the fourth busbars BB22 and BB23 of which only the terminals are shown;
the fifth busbars BB30, BB31, BB32 and BB33 of which also only the terminals are shown;
the sixth busbar BB40.

The switching arrangement SA is of the type disclosed in the Dutch patent application No. 7202503 corresponding to U.S. Pat. application Ser. No. 335,683 filed Feb. 26, 1973, and is constituted by a switching network SN which is, for instance, a toll telephone switching network and by peripheral circuitry PC adapted to perform operations in this switching network SN under the control of one of the processors CPU0 and CPU1 which are the only ones having access to the peripheral circuitry PC via the first busbars BB00 and BB01 respectively. The aim of these operations is to control the establishment and release of call connections through the toll telephone switching network SN which is for instance constituted by a plurality of incoming and outgoing junctors interconnected by a plurality of linked switching stages. The various data collected from the switching network by the processors CPU0 and CPU1 are processed by these processors and by the processors CPU2 and CPU3.

To this end, each of the processors CPU0 to CPU3 is able to execute a series of base level programs and a series of interrupt programs which may interrupt any of these base level programs. These interrupt programs are the following:

clock interrupt programs. These programs are executed after the occurrence of a so-called clock interrupt signal which is generated every 10 milliseconds;

trap interrupt programs. These programs are executed after the occurrence of a so-called trap interrupt signal which is generated upon an important error being detected in the system; and status interrupt programs. These programs are executed after the occurrence of a so-called status interrupt signal which is generated upon the status of one of the processors having changed.

It should be noted that a trap interrupt signal due to its importance may interrupt any program, that a clock interrupt signal may interrupt any program a trap interrupt program excepted and that a status interrupt program may only interrupt a base level program.

The memory blocks PMB0, PMB1, PMB2 and PMB3 are each used to store all the above mentioned programs. The processors CPU0, CPU1, CPU2 and CPU3 have access to the private program memory blocks PMB0, PMB1, PMB2 and PMB3 via the respective second busbars BB10, BB11, BB12 and BB13 and the respective memory controllers PMB0C, PMB1C, PMB2C and PMB3C. In connection with FIG. 1 it should be noted that a cross on a portion of a second busbar indicates that this portion is not used.

Each of the processors has access to all the programs and is able to execute these programs, the latter being normally distributed over the processors in the way described in the above mentioned United States and Dutch patent applications. As disclosed therein, each processor has an associated modifiable function distribution mask which is constituted by at least one word of binary bits which are each associated to a distinct one of the programmes and which are 1 or 0 depending on this program having to be executed, or not, respectively.

Use is made also of treated-by-me tables to distribute the load over two or more processors in case the latter execute the same program. These tables, for instance, indicate the incoming and outgoing junctors of the switching network SN to be handled by the respective processors.

The memory blocks TMB0 and TMB1 are each used to store identical semi-permanent translator information permitting the code conversion of certain data provided during the operation of the system. The processors CPU0 and CPU2 have access to the translator memory block TMB0 via the respective second busbars BB10 and BB12 and the memory controller TMB0C, whilst the processors CPU1 and CPU3 have access to the translator memory block TMB1 via the respective second busbars BB11 and BB13 and the memory controller TMB1C.

The above mentioned memory further includes a plurality of data storing blocks of which only DMB0 and DMB1 are shown. The processors CPU0, CPU1, CPU2 and CPU3 are connected to each of the memory controllers DMB0C and DMB1C associated to the respective data memory blocks DMB0 and DMB1 via the busbars BB10, BB11, BB12 and BB13 respectively. Each of the data memory blocks such as DMB0 and DMB1 is generally used to store two types of data:

redundant constant and variable data i.e. data which are also stored in another data memory block. These variable data may not be recovered by testing the switching network SN;

variable data which may be recovered by testing the switching network SN. An example is, for instance, the data indicating the state of the links interconnecting the switching stages which constitute the above switching network SN.

The processors CPU0 and CPU1 are further connected to each of the memory controllers PMB0C, TMB0C, PMB1C, TMB1C, DMB0C and DMB1C via the third busbars BB20 and BB21 respectively. These third busbars are used to perform control operations in these controllers as will be explained later.

The above mentioned status unit device SUD includes a plurality of status units SU0, SU1, SU2 and SU3 which are each associated to a distinct one of the processors CPU0, CPU1, CPU2 and CPU3 respectively. The processors CPU0 and CPU1 are connected to the status units SU0 and SU1 via the above third busbars BB20 and BB21 respectively, while the processors CPU2 and CPU3 are connected to the status units SU2 and SU3 via the fourth busbars BB22 and BB23 respectively. The processors CPU0, CPU1, CPU2 and CPU3 are finally also connected to the status units SU0, SU1, SU2 and SU3 via the fifth busbars BB30, BB31, BB32 and BB33 respectively. In FIG. 1 only the terminals of these fourth and fifth busbars are shown. The status units which are further interconnected via the common sixth busbar BB40 are each used to store the status of the associated processor in a way analogous to the one disclosed in the Belgian patent 693 071 corresponding to U.S. Pat. 3,562,716. The four possible states are now on-line, halt, reload and maintenance wherein:

on-line means that the processor is in a condition wherein it executes operative programs.

reload means that the processor is in a condition wherein it executes test programs or loads the memory blocks with data and/or programs;

maintenance means that the processor is in a condition wherein it is at the disposal of the maintenance personnel;

halt means that the processor does not operate.

Each of the processors CPU0 to CPU3 is able to modify its associated status unit SU0 to SU3 via its associated third busbar BB20 or BB21 or fourth busbar BB22 or BB23, respectively, and to modify one of the other status units via its associated busbar BB20 to BB23 and the common sixth busbar BB40. Upon the occurrence of a modification in a status unit the associated processor is informed thereof via the associated fifth busbar BB30, BB31, BB32 or BB33, while the other processors are informed via the common sixth busbar BB40 and the associated fifth busbar.

In connection with the above it should be noted that each of the memory controllers stores a fixedly wired first address which may only be modified by operating switches and which permits the memory controller to be addressed via one of the third busbars BB20 and BB21, and a second address which is modifiable under program control and which permits the memory controller to be addressed via one of the second busbars BB10 to BB13. The second address of a memory controller is an address which is indicative of the nature of the contents of the memory block to which this controller is associated and must therefore be modified when this nature is modified e.g. a translator memory block which is at a certain moment used as a data block. The first address is independent of the nature of the contents of the memory block and is therefore invariable.

Figure 2:
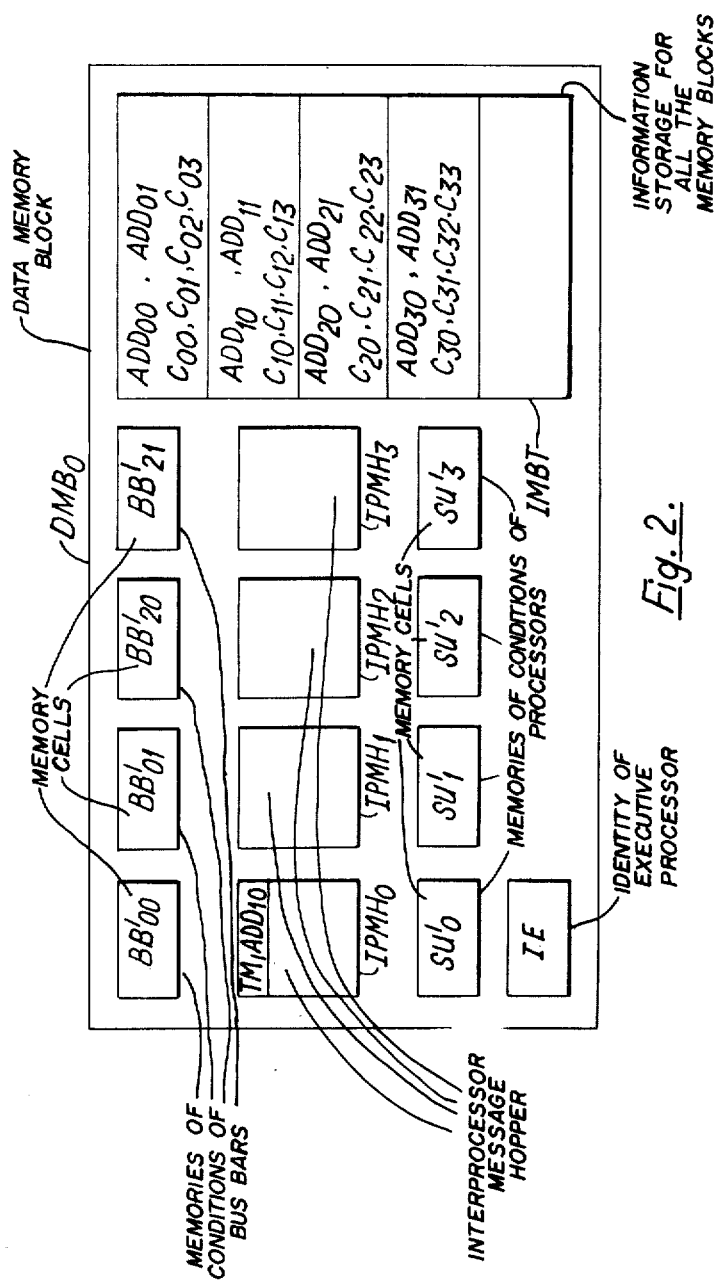
FIG. 2 shows the data memory block DMB0 of FIG. 1 in more detail.

Principally referring to FIG. 2 the latter shows part of the data memory block DMB0 and more particularly the portion thereof including:

cells BB'00, BB'01, BB'20 and BB'21 storing the availability (non-faulty) of non-availability (faulty) condition of the first busbars BB00 and BB01 and of the third busbars BB20 and BB21 respectively:

cells SU'0 to SU'3 each storing one of the possible (on-line, halt, reload or maintenance) conditions of the processors CPU0 to CPU3 respectively;

cell IE storing the identity of a so-called executive processor, defined later;

cells or interprocessor message hoppers IPMH0 to IPMH3 which are associated to the processors CPU0 to CPU3 respectively and which are used to enable these processors to intercommunicate;

a table IMBT storing information about all the above mentioned memory blocks and controllers and more particularly the first and second addresses of these memory controllers and the fact that the second busbars BB10 to BB13 are or are not used in cooperation with these memory controllers.

For instance:

for the data memory controller DMB0C the first and second addresses ADD00 and ADD01 and the used or not used indicating conditions C00, C01, C02 and C03 of the second busbars BB10, BB11, BB12 and BB13 respectively. These conditions indicate that all these busbars are used in cooperation with the memory controller DMB0C;

for the data memory controller DMB1C the first and second addresses ADD10 and ADD11 and the used or not used conditions C10, C11, C12 and C13 of the second busbars BB10, BB11, BB12 and BB13 respectively, all these busbars being used in cooperation with the memory controller DMB1C;

for the translator memory controller TMB0C the first and second addresses ADD20 and ADD21 and the used or not used conditions C20, C21, C22 and C23 of the second busbars BB10, BB11, BB12 and BB13 respectively. These conditions indicate that the second busbars BB10, BB12 and BB11, BB13 are used and not used respectively (as also indicated by the crosses) in cooperation with TMB0C;

for the translator memory controller TMB1C the first and second addresses ADD30 and ADD31 and the conditions C30, C31, C32 and C33 of the second busbars BB10, BB11, BB12 and BB13 respectively. These conditions indicate that the busbars BB10, BB12 and BB11, BB13 are not used and used respectively in cooperation with TMB1C (as also indicated by the crosses).

Since the translator memory blocks TMB0 and TMB1 store the same information the second addresses ADD21 and ADD31 are in fact identical.

It should be noted that the above mentioned variable data stored in the data memory block DMB0 are also registered in the data memory block DMB1.

As mentioned above with reference to FIG. 1, the processors CPU0, CPU1, CPU2 and CPU3 are connected to the memory controller DMB1C associated with the data memory block DMB1 via the busbars BB10, BB29; BB11, BB21; BB12; and BB13 respectively.

Figure 3:
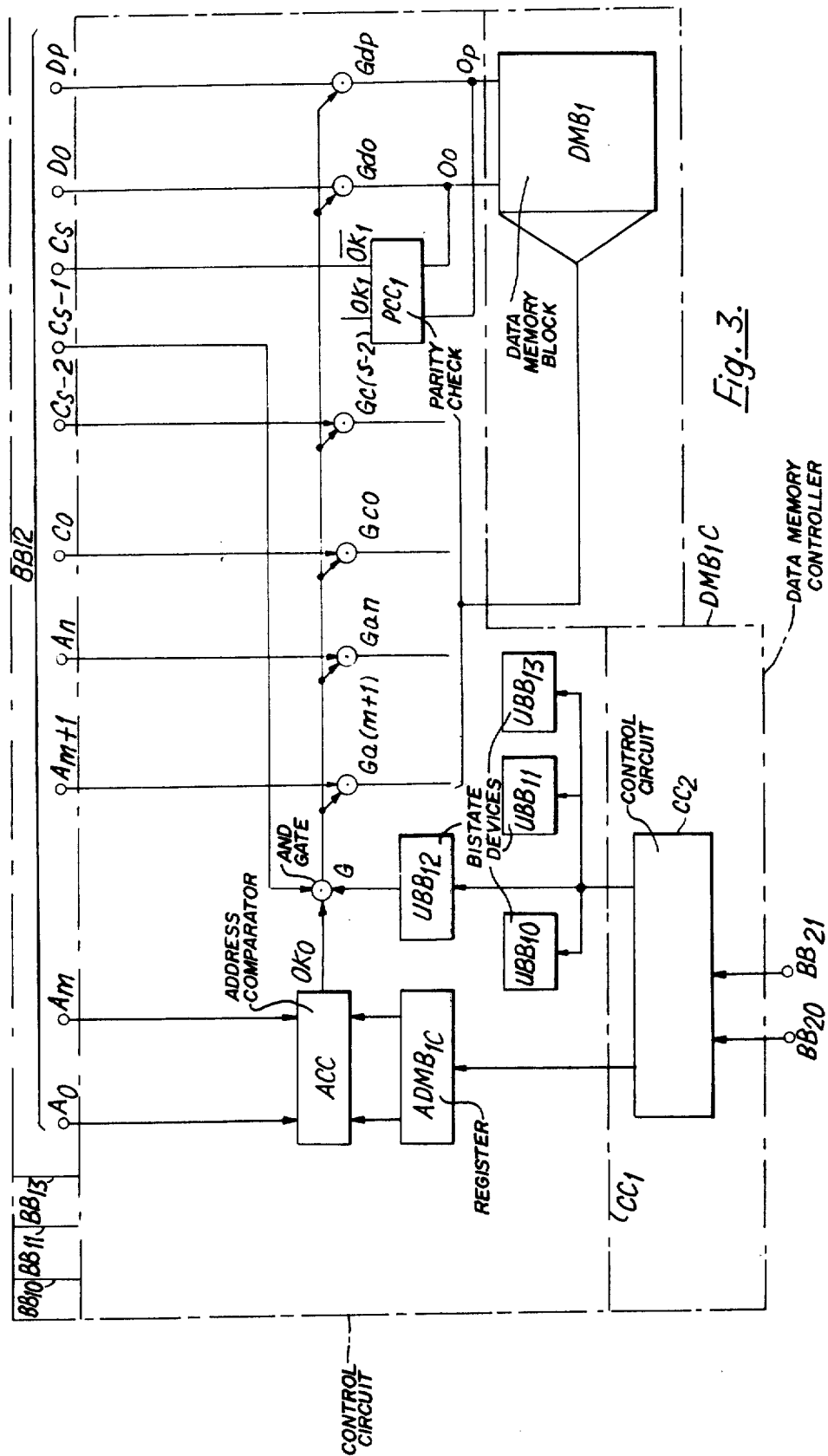
FIG. 3 represents the data memory block DMB1 and part of the associated data memory controller DMB1C of FIG. 1 in more detail.

Principally referring to FIG. 3 the latter shows the data memory block DMB1 and part of the associated memory controller DMB1C which includes the control circuits CC1 and CC2. The control circuit CC1 is connected to the second busbars BB10, BB11, BB12 and BB13. Only the busbar BB12 and the part of the control circuit CC1 connected to this busbar BB12 are shown in detail. The control circuit CC2 is connected to the busbars BB20 and BB21 and is not shown in detail. It is however analogous to the control circuit CC'2 to be described in relation with FIG. 4.

The busbar BB12 shown includes a plurality of conductors used to transfer information between the processor CPU2 and the memory controller DMB1C;

address conductors with terminals Ao to Am which are used to transfer the second address ADD11 of the memory controller DMB1C from the processor CPU2 to this controller;

address conductors with terminals Am+1 to An which are used to transfer an address of a cell of the data memory block DMB1 from the processor CPU2 to the controller DMB1C;

control conductors with terminals Co to Cs−2 which are used to transfer information regarding an operation to be executed, e.g. a read or write operation, from the processor CPU2 to the memory controller DMB1C;

a control conductor with terminal Cs−1 which is used to transfer a strobe signal from the processor CPU2 to the memory controller DMB1C;

a control conductor with terminal Cs which is used to transfer a parity error indicating trap interrupt signal from the memory controller DMB1C to the processor CPU2;

data conductors with terminals Do to Dp which are used to transfer data from the processor CPU2 to the data memory block DMB1 and vice-versa, the conductor with terminal Dp being used for the transfer of a parity bit associated to the data on the conductors with terminals Do to Dp−1 (not shown).

The control circuit CC1 includes:

a register ADM1C storing the above mentioned modifiable second address ADD11 of the memory controller DMB1C;

an address comparator circuit ACC to compare the second address stored in ADMB1C with the address provided on the address conductors with terminals Ao to Am;

bistate devices UBB10, UBB11, UBB12 and UBB13 which indicate that the corresponding second busbars BB10, BB11, BB12 and BB13 are used or not used in cooperation with the memory controller DMB1C. In the present case all these bistate devices indicate that these second busbars are used;

a parity check circuit PCC1 which is used to check the parity of the data;

AND gates G, Ga(m+1) to Gan, Gco to Gc(s−2) and Gdo to Gdp.

The control circuit CC1 may be used to address a cell in the memory block DMB1, while the control circuit CC2 may be used to modify the second address ADD11 and the conditions of the bistate devices UBB10, UBB11, UBB12 and UBB13, stored in the register ADMB1C, as will be explained later.

AS already mentioned above with reference to FIG. 1, the processors CPU0, CPU1, CPU2 and CPU3 are connected to the memory controller TMB0C associated with the translater memory block TMB0 via the busbars BB10, BB20; BB11, BB21; BB12; and BB13 respectively. In the figure, the busbars BB11 and BB13 carry a cross, meaning that these busbars are not used in cooperation with the TMB0C.

Figure 4:
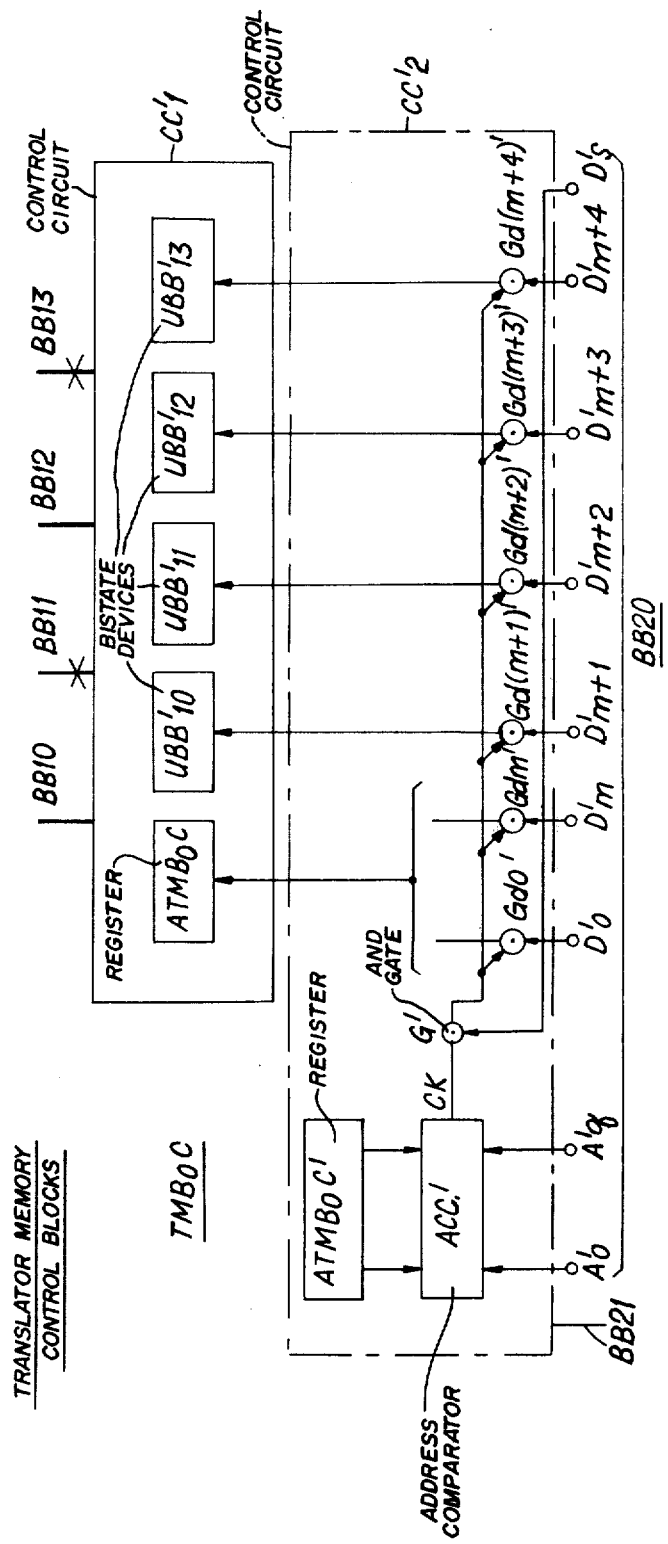
FIG. 4 shows part of the memory controller TMB0C of FIG. 1 in more detail.

Principally referring to FIG. 4 the latter shows part of the translator memory block TMB0C comprising the control circuits CC'1 and CC'2. The control circuit CC'1 which is connected to the busbars BB10, BB11, BB12 and BB13 is not shown in detail. It is however analogous to the control circuit CC1 of FIG. 3. The control circuit CC'2 is connected to the busbars BB20 and BB21. Only the busbar BB20 and the part of the control circuit CC'2 connected to this busbar BB20 are shown in detail.

The control circuit CC'1 includes:

a register ATMB0C storing the above mentioned modifiable second address ADD21 of the memory controller TMB0C;

bistate devices UBB'10, UBB'11, UBB'12 and UBB'13 which indicate that the corresponding second busbars BB10, BB11, BB12 and BB13 are used or not used in cooperation with the memory controller DMB1C. In the present case these bistate devices indicate that the second busbars BB10, BB12 and BB11, BB13 are used and not used in cooperation with the DMB1C respectively.

The control circuit CC'2 includes:

a register ATMB0C' storing the above mentioned fixed first address ADD20 of the memory controller TMB0C;

an address comparator circuit ACC' to compare the first address stored in ATMB0C' with an address provided on the address conductors with terminals A'o to A'q forming part of the busbars BB20. This busbar further includes data conductors with terminals D'o to D'm+4 serving to transfer data from one of the processors to the control circuit CC'1 and a control conductor with terminal D's serving to transfer a strobe signal from one of the processors to the control circuit CC'1;

AND gates G', Gd0' to Gd(m+4)'.

In order to prevent a total breakdown of the data rocesing system to occur after an important fault has been detected therein, there is always selected in advance a processor which is the most suitable one to handle without delay the most important functions, these functions depending on the nature of the fault. This pre-selected processor is hereinafter called the executive processor.

The most important functions to be executed after the occurrence of an important system fault are:

firstly the detection and storage of the releasing call connections in the switching network SN since, among other consequences, the telephone subscribers would otherwise be unduly charged for these connections;

secondly the reconfiguration of the system i.e. a modification of the access of the processors to the memory blocks.

Therefore a pre-selectable processor should:
obviously be on-line;
have a first busbar BB00 or BB01 giving access to the switching arrangement SA to permit the detection and storage of the releasing call connections;
have a third busbar BB20 or BB21 if a reconfiguration must be executed.

These conditions may be expressed by the function $$y = a(2b + c)$$

herein the variables $a$, $b$ and $c$ have the following meaning:

$a$ is a binary which indicates that a processor operates on-line or not (this implies that it simultaneously is operative and has a correct second busbar BB10, BB11, BB12 or BB13 or not respectively);
$b$ is a binary bit which indicates that a processor has a first busbar BB00 to BB01 or not;
$c$ is a binary bit which indicates that a processor has a third busbar BB20 or BB21 or not. Hereby the variable $b$ is multiplied by 2 since it is considered to be of more importance than the variable $c$.

Since in order to be pre-selectable a processor should at least be on-line and have a first busbar the minumum value of $y$ for such a processor is equal to 2 when this processor must not be able to control a reconfiguration operation. This minimum value is however equal to 3 when a pre-selectable processor must also be able to control a reconfiguration operation.

Among the pre-selectable processors the one having the highest value of $y$ is chosen as the executive processor.

From $y = a(2b+c)$ it follows that the value of this function for a processor changes when the value of at least one of the variables $a$, $b$ and $c$ thereof changes. This means that upon the occurrence of such a change the processor which is the executive one at that moment may become not executive. Therefore each processor is able to calculate the function $y$ for all the processors, but when a higher mentioned change occurs only the executive processor calculates the value of the function for all the processors, including itself, and compares these values. The processor having the highest value of $y$ then becomes the new executive processor. When such a change occurs the executive processor must also be able to re-distribute the call processing load over the processors.

From the above it follows that the executive processor should be able to execute the following programs:

a. a take-over message handling program which ensures that releasing call connections will be detected and stored;
b. a select replacing memory block program and a take-over programme to control a configuration operation;
c. a select executive processor program;
d. a call processing distribution program.

In the following, two examples are described wherein the executive processor executes the above two mentioned programs ($c$) and ($d$). Then a further example is given wherein the executive processor executes the above two mentioned programs ($a$) and ($b$).

It should be noted that neither of the processors CPU2 nor CPU3 can become the executive processor, since for each of them the value $b$ is equal to 0 so that $y$ is at maximum equal to 1.

The operation of the above described data processing system is as follows.

After all the constituent elements of the system have been checked one of the processors CPU0 and CPU1, e.g. CPU0, is brought on-line and chosen as the executive processor. For this processor the value of the above function $y$ is equal to 3 since this processor has a correct BB00, BB10 and BB20. The identity of this processor CPU0 is inscribed in the cell IE of the data memory blocks DMB0 (FIGS. 1, 2) and DMB1 (FIG. 1).

The executive processor CPU0 then brings the status units SU1, SU2 and SU3 of the processors CPU1, CPU2 and CPU3 from the halt condition to the reload condition via the busbars BB21, BB22 and BB23 respectively.

Considering first the status unit SU1 of processor CPU1, a status interrupt signal is generated therein and applied to the various processors CPU0 to CPU3 via the busbars BB40, BB30; BB31; BB40, BB32; and BB40, BB33 respectively. Upon the receipt of this status interrupt signal each of these processors checks whether it is the executive or not and only when it is the executive processor it accepts this signal. Also the executive processor however does not react to this signal since the transition from the halt condition to the reload condition is a normal one. In the same way as described in Belgian patent 693,071 corresponding to U.S. Pat. 3,562,716, the processor CPU1 is then loaded from a magnetic tape with test programs and when the latter have been executed successfully it is loaded with data and operative programs. Afterwards the processor CPU1 brings itself in the on-line condition. Via the busbar BB21 it hereby modifies the condition of its status unit SU1 in order that the latter should indicate this on-line condition. Due to this modification a status interrupt signal is generated in the status unit SU1 and handled in the same way as described above. The executive processor CPU0 now however reacts to this signal by executing a select executive processor program (FIG. 6). This program is only executed by the processor CPU0 in order to prevent possible conflicts between the processors due to the busbar BB40 being common to all status units.

This program consists in reading the statuses of all the status units SU0 to SU3 via the busbars BB30 and BB40 and in comparing statuses with those stored in the cells SU'0 to SU'1 of the data memory block DMB0. In this way the executive processor CPU0 detects that the processor CPU1 has gone on-line. Since this status change affects the value of the variable $a$ of the function $y$ for processor CPU1, the executive processor CPU0 calculates this $y$ for this processor CPU1 from the values of $a$, $b$ and $c$ stored in SU'1, BB'01 and BB'21 of DMB0 and compares it with its own value for $y$. In case the value of $y$ for CPU1 is larger than the value of $y$ for CPU0, which can only be the case when also one of the values of $a$, $b$ and $c$ has changed for processor CPU0, the processor CPU1 is chosen as the new executive processor. Since the processors CPU0 and CPU1 however have just been tested, the values of $y$ for the processor CPU1 will most probably be the same as that for the processor CPU0 and in this case CPU0 is maintained as the executive processor.

In the same way as the processor CPU1 the processors CPU2 and CPU3 are then successively brought on-line and each time the function $y$ is calculated for these processors. The executive processor makes no distinction between the processors CPU0 and CPU1 on the one hand and CPU2 and CPU3 on the other hand. However neither of the latter processors CPU2 or CPU3 has a first busbar giving access to the switching arrangement SA and hence neither of them can become the executive processor.

Each time a processor has thus been brought on-line the executive processor CPU0 also executes the above mentioned call processing distribution program during which the call processing load is distributed over the processors which are then on-line.

Another example of a case wherein the executive processor must execute the select executive processor program is the following. Suppose that the processor CPU0 is the executive processor and that at a certain moment the processor CPU1 becomes faulty and goes off-line and that also the third busbar BB20 becomes faulty. In this case the processor CPU0 remains the executive since the value of its function $y$ is equal to 2, whereas the value of the function $y$ for the processor CPU1 is equal to 0. However, at the moment the processor CPU1 goes again on-line and when the first and third busbars BB01 and BB21 are correct, the processor CPU0 again calculates the values of $y$ for CPU0 and CPU1 and finds that these values are equal to 2 and 3 respectively. Consequently the processor CPU1 then becomes the new executive.

In a further example it is now supposed that all the processors are on-line and that the processor CPU2 which is not the executive one, the latter being CPU0, must read data from the data memory block DMB1. To that end the processor CPU2 executes a read instruction as a consequence of which the second address of the memory controller DMB1C associated to the data memory block DMB1, an address of a cell to be read in the memory block DMB1 and control signals are transmitted on the conductors of the busbar BB12 and applied to the memory blocks PMB2C, TMB0C, DMB0C and DMB1C to which this busbar BB12 has access. In each of these memory blocks the transmitted second address is compared with the second addresses ADD11 stored therein and if this transmitted address is correct the comparison will obviously only be successful in the memory controller DMB1C.

More particularly the above second address, cell address and control signals are applied to the terminals Ao to Am, Am+1 to An, and Co to Cs−1 of the DMB1C respectively. The control signals on the conductors Co to Cs−2 indicate that a read operation must be performed, whereas the control signal on the conductor Cs−1 is a strobe signal. No signals are applied to the conductors with terminals Do to Dp and Cs since a read operation is concerned. In the address comparator circuit ACC the second address applied to the terminals Ao to Am is compared with the second address ADD11 stored in the register ADMB1C. As a result of this the output OKO of this comparator circuit ACC is activated when both addresses are identical, as is supposed. Since as mentioned above the busbar BB12 is available for use in cooperation with the memory controller DMB1C the output of the bistate device UBB12 is also activated so that the strobe pulse applied to the AND-gate G from the control terminal Cs−1 enables the various AND-gates Ga(m+1) to Gan, Gco to Gc(s−2) and Gdo to Gdp. Under control of the memory cell address and the control signals appearing at the outputs of these first two groups of AND-gates Ga(m+1) to Gan and Gco to Gc(s−2) this memory cell of the data memory block DMB1 is read out. Hereby the read-out data appear at the outputs Oo to Op of this data memory block DMB1 where the parity is checked by the parity check circuit PCC1. Supposing that this circuit PCC1 detects a parity error the output $\overline{OK1}$ of this circuit and hence also the control terminal Cs is activated. Thus a so called parity error trap signal is transmitted to the processor CPU2 via the busbar BB12. As a consequence the latter processor CPU2 interrupts its current programme since a trap interrupt signal has the highest priority and starts a trap scanning program (FIG. 5).

The trap scanning program is a diagnostic program the purpose of which is to define the location and nature of the fault origin which provoked the above trap interrupt signal. In the present case this programme detects that the data memory block DMB1 is faulty. Such a program is generally known in the computer art and is therefore not described in detail.

The processor CPU2 communicates the result of the fault diagnosis to the executive processor CPU0, the identity of which is stored in both the data memory blocks DMB0 (cell IE) and DMB1, by writing an interprocessor message in the interprocessor message hopper IPMH0 (FIG. 2) associated to the executive processor CPU0. This IPMH0 forms part of the DMB0 and of the DMB1. This interprocessor message is constituted by the type of message TM; here this type indicates that the message is due to the execution of a trap scanning program;

the first address ADD10 of the memory controller DMB1C associated to the faulty memory block DMB1.

Thereafter the processor CPU2 which detected the fault in the data memory block DMB1 checks whether it is the executive processor or not:

in the negative, as is now the case since the processor CPU0 is the executive one, the processor CPU2 brings itself in the halt condition;

in the positive it starts the execution of a take-over message handling programme (FIG. 5).

All the data memory blocks and hence also DMB1 very frequently operate with all the processors. Within a very short time interval also the processors CPU0, CPU1 and CPU3 are therefore informed of a fault in the DMB1 by a trap interrupt signal. Accordingly the processors CPU1 and CPU3 also first write an interprocessor message in the interprocessor message hopper IPMH0 associated in the DMB0 to the executive processor CPU0 and afterwards bring themselves in the halt condition, due to the fact that they are not the executive processor. The executive processor CPU0 also writes an interprocessor message in its interprocessor message hopper IPMH0 but instead of bringing itself in the halt condition, executes a take-over message handling program (FIG. 5) since its answer to the above check is positive.

It should be noted that each time a processor has been brought in the halt condition the executive processor is informed thereof by a status interrupt signal. These signals however remain without effect since the executive processor receives the trap interrupt signal well before these status interrupt signals are received.

The take-over message handling program controls the modification of the function distribution mask of the executive processor CPU0 in order that the latter should be able to execute in clock level, i.e. every 10 milliseconds a program able to detect the release of call conections established in the switching network SN and to store the gathered information in a correct data memory block e.g. in DMB0.

The executive processor CPU0 subsequently executes the select replacing memory block program (FIG. 4) which consists in finding in the table IMBT (FIG. 2) an available memory block adapted to replace the faulty data memory block DMB1 and associated controlled DMB1C. More particularly, in this table IMBT the executive processor CPU0 finds that there are two translator memory blocks TMB0 and TMB1 which store the same data as indicated by their identical second addresses ADD21 and ADD31 and which may hence be used to replace the faulty memory block DMB1. It is supposed that the executive processor CPU0 selects the memory unit constituted by the translator memory block TMB0 and the controller TMB0C to replace the memory unit constituted by the memory block DMB1 and the controller DMB1C.

In order to replace the DMB1, DMB1C by TMB0, TMB0C it is also necessary:
to render TMB0C accessible to all processors since also DMB1C was accessible to all processors;
to prevent the access of all the processors to DMB1C since the latter is faulty;
to make TMB1C accessible to all processors since it is now the only controller, associated to a translator memory block, of the system.

During the select replacing memory block programme the executive processor CPU0 therefore:
modifies the translator function of the memory controller TMB0C into the data storage function of the faulty memory controller DMB1C by replacing the second address ADD21 of the TMB0C by the second address ADD11 of the DMB1C. Moreover the processor CPU0 makes the memory controller TMB0C accessible to all the processors by scribing the conditions C10, C11, C12, C13 of DMB1C stored in IMBT in the bistate devices UBB′10, UBB′11, UBB′12, UBB′13 of TMB0C (FIG. 4) respectively;
disables the access of all the processors to the memory controller DMB1C associated to the faulty memory block DMB1 by de-activating all the bistate devices UBB10, UBB11, UBB12 and UBB13 of the DMB1C (FIG. 3);

makes the memory controller TMB1C accessible to all the processors by activating all the bistate devices (not shown) of the TMB1C.

Since all these operations are analogous, only the first mentioned ones are described hereinafter by making reference to FIG. 4.

By means of the first address of the memory controller TMB0C the executive processor CPU0 addresses this memory controller TMB0C via the busbar BB20, a first time to replace the modifiable second address ADD21 stored in the register ATMB0C′ by the modifiable second address ADD11 of the memory controller DMB1C associated to the faulty data memory block DMB1 and a second time to modify the conditions of the bistate devices UBB′10 to UBB′13 stored in this memory controller TMB0C. Hereby it should be noted that the executive processor CPU0 finds these addresses ADD20 and ADD21 in the table IMBT (FIG. 2).

Firstly the executive processor CPU0 via the busbar BB20 transmits the fixed first address ADD20 of the memory controller TMB0C, the second address ADD11 of the memory controller TMB1C and a strobe signal to all memory controllers and more applies them particularly to the terminals A′o to A′q, D′o to D′m and D′s of the memory controller TMB0C (FIG. 4), no signals being applied to the terminals D′m+1 to D′m+4 thereof. Obviously only in the TMB0C the address ADD20 may be recognized when it is compared in the comparator circuit ACC′ with the first address ADD20 stored in the register ATMB0C′. When both the compared first addresses are identical, as is supposed, the output OK of the comparator circuit ACC′ is activated so that by the strobe signal on terminal D′s the second address ADD11 of the memory controller DMB1C applied to the terminals D′o to D′m is inscribed in the register ATMB0C′.

In an analogous way the executive processor CPU0 then via the busbar BB20 applies the first address ADD20 of the TMB0C to the terminals A′o to A′q of the TMB0C, the conditions C10 to C13 of the bistate devices UBB10 to UBB13 of the memory controller DMB1C to the terminals D′m+1 to D′m+4 of the TMB0C and a strobe signal to the terminal D′s of the TMB0C. The address ADD20 is again compared with the one stored in the ATMB0C′ and when they are both identical the conditions on the terminals D′m+1 to D′m+4 are copied in the bistate devices UBB′10 to UBB′13.

After the select replacing memory block program has been executed the executive processor CPU0 performs the take-over program proper (FIG. 5). This programme consists in loading in the translator memory block TMB0 all the data which were stored in the faulty data memory block DMB1. As already mentioned above part of these data is also stored in the data memory DMB0, part of these data is constant and is also stored in another data memory block, and finally part of these data are to be recovered by testing the switching network SN. The executive processor CPU0 also forces the processors CPU1, CPU2 and CPU3 in the on-line condition.

Finally, the executive processor CPU0 executes the processor restart program (FIG. 5) which consists in preparing the processors in such a manner that they are able to execute the operational call processing programs.

While the principles of the invention have been described above in connection with specific apparatus, it is to be clearly understood that this description is made only by way of example and not as a limitation on the scope of the invention.

We claim:

1. A data processing control system adaptable to be connected to a plurality of processors which are substantially all alike, a plurality of memory units, which are substantially all alike, a plurality of memory units, a status unit device, a group of said processors being pre-selectable to execute programs stored therein, and first channel means coupled from the status unit device to said pre-selectable processors over which a single one of said pre-selectable processors from said group of pre-selectable processors may be selected as the most suitable one to execute said programs, a switching arrangement coupled to each of said pre-selectable processors by an individual second channel, means coupling each of said processors to a plurality of said memory units via an individual third channel, means coupling each of said pre-selectable processors to all said memory units via an individual first channel and means including a control circuit coupled via a fourth channel with a pre-selected processor to enable a pre-selected processor to calculate for each processor, itself included, the value of a function which is dependent on a plurality of variables which determine the operative or non-operative conditions of the processor and the availability or non-availability to the respective processor of a first channel, a second channel and a third channel, and means coupled to said control circuit to enable pre-selection of another pre-selectable processor as the most suitable one.

2. A data processing control system according to claim 1, in which means are provided by which said variables are stored in at least one memory unit which is accessible to all said pre-selectable processors.

3. A data processing control system according to claim 2, in which means are provided by which said variables are stored in at least two memory units which are accessible to all said pre-selectable processors.

4. A data processing control system according to claim 1, in which said pre-selected processor executes said function calculation each time the value of at least one of the variables of said function for a processor changes.

5. A data processing control system according to claim 1, including a plurality of status units each coupled to an associated processor via an individual fourth channel and to each other via a common fifth channel, each associated processor being able to change the record of its status stored in the status unit coupled to it via the fourth channel, a status change being communicated to the associated processor via the associated fourth channel and to each of the other processors via said fifth channel and the fourth channel associated to said other processor.

6. A data processing control system according to claim 5, including means through which at least one of said memory units is made accessible to all said pre-selectable processors and also stores the status of said processors, and said pre-selected processor upon being informed of a said status change first compares the status stored in said one memory unit and in said status units to derive therefrom the processor which has changed its state.

7. A data processing control system according to claim 1, in which each of said memory units is provided with fault detection means coupled to each of said processors via said second channels to inform this processor upon the detection of a fault and each of said processors upon being informed of such a fault executes a diagnostic program to detect the location and nature of the fault, the result of this diagnosis being stored in at least one of said memory units to which all said processors have access.

8. A data processing control system according to claim 1, in which each of said memory units includes a first register storing a modifiable address to access the memory unit by a processor via a said second channel intercoupling this processor and this memory unit, a bistate device being associated to each second channel coupled to the memory unit to indicate whether this channel is used or not used in cooperation with this memory unit, and said memory unit is accessible via a said third channel to modify said first address and the condition of said second channel.

9. A data processing control system according to claim 8, in which said modifiable address of a memory unit is indicative of the location of contents of this memory unit.

10. A data processing control system according to claim 1, in which each of said memory units includes a second register storing a fixed address to access the unit by one of said two processors via a said third channel.

11. A data processing control system according to claim 1, which includes memory units storing the same semi-permanent data.

* * * * *

PO-1050
(5/69)

UNITED STATES PATENT OFFICE
CERTIFICATE OF CORRECTION

Patent No. 3,964,055                                Dated    June 15, 1976

Inventor(s)   Valere Jean Marie Carruet et al.

It is certified that error appears in the above-identified patent and that said Letters Patent are hereby corrected as shown below:

Column 13, line 9, the words "a plurality of memory units," should be cancelled.

Signed and Sealed this

Twenty-first Day of September 1976

[SEAL]

Attest:

RUTH C. MASON
*Attesting Officer*

C. MARSHALL DANN
*Commissioner of Patents and Trademarks*